United States Patent [19]

Mitchell

[11] Patent Number: 4,779,844
[45] Date of Patent: Oct. 25, 1988

[54] DRAW WORKS FOR MOBILE CRANES

[76] Inventor: Donald G. Mitchell, 10600 Wallisville Rd., Houston, Tex. 77013

[21] Appl. No.: 52,861

[22] Filed: May 22, 1987

[51] Int. Cl.⁴ ............................ B66D 1/20; B66D 3/16
[52] U.S. Cl. ..................... 254/323; 254/312; 254/359
[58] Field of Search ............... 254/219, 295, 299, 301, 254/302, 311, 312, 359, 358, 323; 474/101, 111, 136, 144, 268; 212/170, 172, 232, 255

[56] References Cited

U.S. PATENT DOCUMENTS

| | | | |
|---|---|---|---|
| 1,060,165 | 4/1913 | Cole | 254/359 X |
| 1,570,591 | 1/1926 | Mercer | 474/136 X |
| 1,900,937 | 3/1933 | Kahlerth | 254/311 X |
| 2,248,326 | 7/1941 | Baker | 212/172 X |
| 2,380,626 | 7/1945 | Zeilman et al. | 414/690 X |
| 2,469,296 | 5/1949 | Farrell et al. | 474/136 X |
| 3,887,164 | 6/1975 | Coombs | 254/312 X |
| 3,944,185 | 3/1976 | Evans | 254/359 X |
| 4,422,396 | 12/1983 | Szostak | 474/144 X |
| 4,466,803 | 8/1984 | Wilson | 474/136 X |
| 4,498,891 | 2/1985 | Mashimo et al. | 474/268 X |
| 4,514,179 | 4/1985 | Skura | 474/204 |
| 4,521,208 | 6/1985 | Doveri | 474/101 |
| 4,652,252 | 3/1987 | Westhoff et al. | 474/204 |

Primary Examiner—Stanley N. Gilbreath
Assistant Examiner—Joseph J. Hail, III
Attorney, Agent, or Firm—Leitner, Greene & Christensen

[57] ABSTRACT

A draw works for a mobile crane, to selectively reel in and reel out the cable of the crane by appropriate rotation of the cable pulley, includes a stable platform having mounted in fixed relationship therewith an engine with a rotatable output shaft, a rotatable speed reduction wheel, and a rotatable idler wheel. A pinion is mounted on the engine output shaft, and is aligned in a common plane with the speed reduction wheel and the idler wheel. The pinion and the reduction wheel are separated from one another, and the idler wheel is adjustably mounted on a stanchion between the two. A flexible endless belt is wrapped and retained on the pinion and the reduction wheel to engage a portion of the circumference of each for translational movement of the belt with rotation of the pinion, and thereby to rotate the reduction wheel. The belt, the pinion, and the reduction wheel are provided with transverse curved mating teeth on the respective engaging surfaces thereof for precise meshing of the belt teeth with the teeth on each of the pinion and the reduction wheel. The idler wheel is urged against the smooth outer surface of the belt to apply tension to the belt and remove the slack therefrom, and thus to increase the wrap of the belt about the reduction wheel to engage about 75% of the circumference thereof.

3 Claims, 2 Drawing Sheets

DRAW WORKS FOR MOBILE CRANES

BACKGROUND OF THE INVENTION

1. Field of the Invention

The present invention relates generally to drive systems for mobile power equipment, and more particulraly to draw works for driving the cable of mobile power cranes.

2. Relevant Background

Early forms of mobile power driven machinery or equipment, such as cranes and power shovels, utilized drive systems or draw works in which the shaft was coupled to a wheel driven by a belt about the engine pulley of the power unit. An example of such an arrangement is shown and described in U.S. Pat. No. 2,380,626 to Zeilman et al. The draw works is the portion of the power equipment employed to feed or reverse a cable used for lifting or lowering operations. In a crane, of course, the cable and associated hook or other retention means usually serves to lift and lower heavy or bulky construction materials from one location to another at the job site. In a power shovel, the cable may be used to operate the shovel portion itself.

The prior art belt driven systems were notorious for power transfer problems caused by belt slippage or creepage. Belt slippage resulted in seriously inefficient power transfer from the engine pulley to the shaft of the gear train used to drive the cable. Moreover, the slippage probelm resulted in overheating of the belt itself, and ultimately in the rupture of the belt if the equipment were used continuously for even relatively short periods of time. Overheating of the engine was also a probelm because of the inefficient power transfer. Accordingly, it was necessary to shut down the equipment at regular intervals to allow the components to cool down, but even that measure was inadequate to prevent relatively frequent breakdowns.

In an effort to alleviate the slippage problem in some types of belt driven machinery, idler pulleys, some of which were vibrating or adjustable, were used to force the belt into a greater degree of engagement with the main drive pulley. An example of such an arrangement is described in U.S. Pat. No. 1,570,591 to Mercer. However, these techniques in and of themselves were not successful where heavy equipment such as a crane draw works was involved. In fact in many cases it was found that increasing the tension on the belt, coupled with continuing creepage, caused the belt to snap.

Partly as a result of these problems the equipment manufacturers moved away from belt driven systems, and ultimately to the use of chains as the standard for draw works in cranes. An example of the chain drive system is shown in U.S. Pat. No. 2,248,326 to Baker, which describes a cable operated excavating shovel. However, although the use of chain driven draw works has eliminated some of the problems that had been encountered with prior art belt driven systems, the chain driven units are not without their own set of problems.

For example, chain drives require constant lubrication, particularly where used for relatively large draw works intended for long periods of continual operation. Typically, lubrication is supplied by running the chain through a lubricant case or crankcase positioned between the sprocket wheels about which the chain is wrapped. The lubricating system including the case and the associated lubricating pump must undergo regular routine maintenance to assure smooth running operation of the pump and an absence of leaks in the crankcase. Failure to perform such maintenance and to repair or replace faulty components will result in inadequate or a complete absence of the required lubrication, and ultimately, in chain burnout.

Burnout is a serious problem encountered all to often in chain driven draw works, and since it occurs while the equipment is in use, it means the equipment will be down all or part of a day at the job site, where the environmental conditions for ill-suited for repair or replacement. Alternatively, the equipment must be loaded on a flat bed trailer for return to the storage or maintenance yard where repair or replacement is most efficiently performed. To a contractor, equipment down time is often the largest single factor in delays or failure to timely complete the work, and the difference between a profit or loss on the job.

It is a principal object of the present invention to provide an improved drive system for mobile power equipment draw works, and especially for mobile crane draw works.

SUMMARY OF THE INVENTION

According to a preferred embodiment of the present invention, a belt driven draw works for a mobile crane is provided in which the inner surface of the flexible endless drive belt has beveled or curvilinear teeth arranged to mesh precisely with the mating teeth of a pair of spaced-apart sprocket wheels about which the belt is wrapped. The sprocket wheels are thereby configured to preclude alteration of tooth spacing during flexing of the belt. One of the sprocket wheels is a small diameter engine pinion coupled to the power take-off shaft of the crane drive engine, and the other sprocket wheel is a large diameter reduction wheel that serves, among other things, to reduce the speed in a known manner from, in one embodiment, 1800 RPM at the engine pinion to 60 RPM at the reduction wheel. A spur gear on the opposite end of a shaft at the hub of the reduction wheel drives the gears which, through conventional forward and reverse drive trains, reel the crane cable out and in via a cable pulley.

According to a feature of the invention, an idler wheel acting as a torque adjustment wheel is fixedly positioned for rotation in the path of the drive belt to take up virtually all the slack in the belt and to increase the wrap of the belt about the reduction wheel to from 72% to 78% of the circumference of the reduction wheel, and preferably at the optimum of 75%. The idler wheel is rotatably mounted on a heavy stanchion to assure freedom from vibration or or any other movement except rotation as the outer surface of the belt rolls across the wheel. This is essential in the case of a heavy equipment drive system with considerably spacing between the sprocket wheels, as is the situation with a crane draw works.

The belt driven crane draw works of the present invention may be used as a replacement for the existing chain drive draw works of a mobile crane or other suitable mobile power equipment, or may be provided as original equipment draw works for new cranes or other such mobile equipment. Unlike the presently utilized chain drive systems, the belt driven draw works of the invention requires no lubrication; is considerably less likely to experience breakdown; and provides greater visibility of all moving parts and, thus, greater opportunity to alleviate the source of a problem before it becomes irreparable. Moreover, the belt driven draw works of the present invention is a substantial improvement over prior art belt drive systems in that the belt and sprocket wheels are configured and adapted to provide a much more efficient transfer of power, with no tendency for slippage or creepage, owing in major part to the precisely meshing curvilinear teeth in the two mating components and in further part to the high percentage of wrap of the belt on the reduction wheel.

Accordingly, it is another object of the present invention to provide a crane draw works which produces a more efficient transfer of power from the engine to the cable drive shaft than has heretofore been available in a nonlubricated system.

A further, more specific object of the invention is to provide a crane draw works utilizing a belt wrapped between a pair of sprocket wheels, in which the belt has curvilinear teeth matching those on the sprocket wheels to assure precise meshing and positive engagement therebetween, one of the wheels being the engine pinion and the other wheel being utilized for speed reduction to drive the forward-reverse gear train for a cable pulley, and in which an idler wheel is urged against the belt between the two sprocket wheels to increase tension, remove slack, and increase the wrap of the belt to about 75% of the circumference of the reduction sprocket wheel, without need for lubrication of those parts.

A belt driven draw works according to the preferred embodiment of the present invention was installed in a used crane to replace the lubricated chain driven system previously employed in the crane. The chain driven system had undergone numerous breakdowns because of failure of the lubrication system and resulting chain burnout, or because of chain link failures. No failures have been experienced with the prototype belt driven draw works despite regular daily ongoing use of the modified crane for a period of several months in the usual hostile environment of a crane yard.

BRIEF DESCRIPTION OF THE DRAWINGS

The above and other objects, aspects, features and advantages of the present invention will become more apparent from a consideration of the ensuing detailed description of a presently preferred embodiment thereof, taken together with the accompanying drawings, in which.

DETAILED DESCRIPTION OF THE PREFERRED EMBODIMENT

Figure 1:
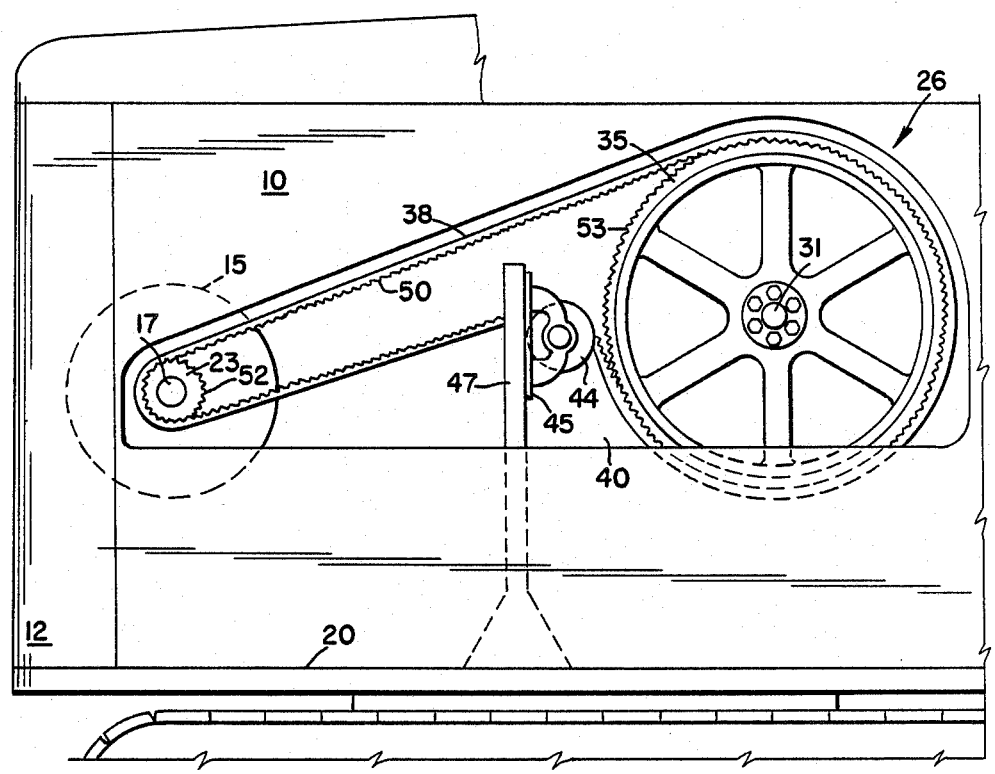
FIGS. 1 and 3 are a side view and a top view, respectively, of a crane draw works according to the presently preferred embodiment of the invention.
Figure 3:
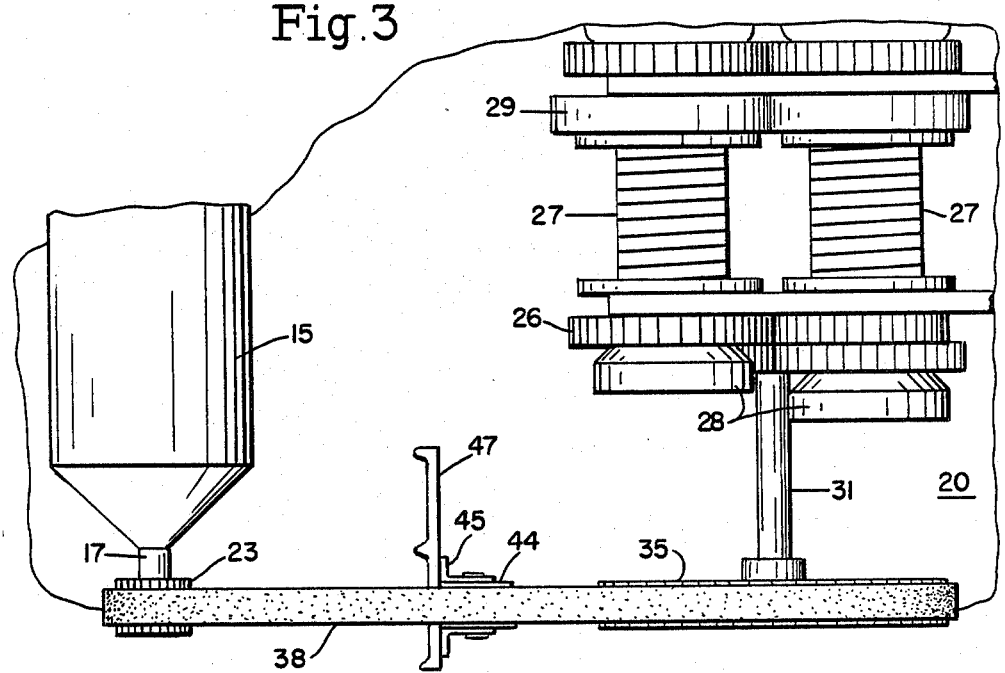

Referring now to FIGS. 1 and 3, a presently preferred embodiment of the invention comprises a draw works generally designated as 10 or a mobile crane 12. By way of example, crane 12 may be a Link-Belt Model LS 98, 108 or 118, or Link-Belt Model HC 98 or 108. Each of these models as manufactured by the OEM (original equipment manufacturer), the Link-Belt Corporation, is equipped with a chain driven draw works and lubricating system, all of the general type described as prior art in the Background section of this application, above. The embodiment of the invention described herein, then, would be utilized as a replacement for the original equipment draw works. However, as previously noted, the present invention may be provided as the original equipment draw works. Also, while the embodiment presented herein is described in the environment of a modile crane, the invention may be employed in other types of modile power equipment having a draw works for operating a cable, such as an excavating shovel.

The draw works 10 includes a conventional power source 15 having a rotatable shaft 17 which constitutes the power take-off or power output element of the source. The power source 15 may, for example, be a gasoline engine or diesel engine or an electric motor, and is fixedly mounted relative to the platform 20 of the cab of mobile crane 12. An engine pinion 23, comprising a small sprocket wheel, is mounted on the end of shaft 17 for rotation therewith.

The gears or gear train of the draw works 10, generally designated by 26, are of the type conventionally utilized in chain drive draw works. In particular, the gears are coupled to a cable pulley system 27 and serve to drive the pulley, and thereby the cable, in either the forward or reverse direction, according to the selection made by the crane operator in the cab, by way of a standard shift lever (not shown). Clutch drums 28 are provided to allow shifting of the gears. Brake drums 29 associated with the cable pulley 27 are connected to the brake pedals (not shown) in the cab. The cable pulley, gears, clutch and brake units of the raw works are conventional and need not be described in detail.

A rotable shaft 31 is coupled to a spur gear of the gear train 26 for rotation therewith. A second rotable sprocket wheel 35 is fastened to the end of shaft 31 opposite the spur gear. Rotation of sprocket wheel 35 causes rotation of gear shaft 31 and thus of the gear train for reeling the cable out or in.

Sprocket wheel 35 is arranged for rotation with engine pinion (small sprocket wheel) 23 by means of an endless flexible belt 38 which is wrapped about the two wheels such that there is some, but relatively little slack in the belt. The mounting location of the second sprocket wheel 35 is set by the location of the gear shaft 31 relative to platform or deck 20, just as the mounting location of engine pinion 23 is set by the location of power output shaft 17 relative to the platform and to the second wheel.

In the case of a prototype of the preferred embodiment, utilizing a Link-Belt crane of one of the aforementioned models, the engine pinion 23 was mounted approximately 30 inches above the platform, sprocket wheel 35 was mounted approximately 38 inches above the platform, and the two wheels were aligned in the same plane with their respective centers spaced apart by about 66 inches. Precise alignment of wheel 35 with pinion 23 is achieved by providing wheel 35 with a split compression hub. When proper alignment is achieved, tightening down of the bolts causes the hub to be squeezed to a slightly smaller inside diameter, thereby securing the wheel in place in that alignment.

Sprocket wheel 35 has a considerably greater outer diameter than the outer diameter of engine pinion 23, to serve as a speed reduction wheel. In the preferred embodiment, the diameter of the wheel 35 was 38 inches and the diameter of the pinion 23 was 7 inches, which was sufficient to reduce the speed of rotation of the draw works from 1800 RPM at the engine pinion 23 to 60 RPM at the reduction wheel 35. Certain distinctive features of the sprocket wheels 23 and 35, and of the endless belt 38 will be described presently.

For safety purposes, the belt may be partially housed in a safety shield 40 running the length of the two sprocket wheels 23 and 35. Preferably, in that event, the safety shield is formed from a high strength transparent plastic material, such as plexiglas or lexan. This will permit the operator or an equipment inspector to view and inspect the condition of the belt without need for removal of the shield, while the shield precludes injury to persons in or around the equipment from direct contact with the moving belt or sprockets, and damage to the moving parts from contact with objects in the immediate vicinity.

Figure 4:
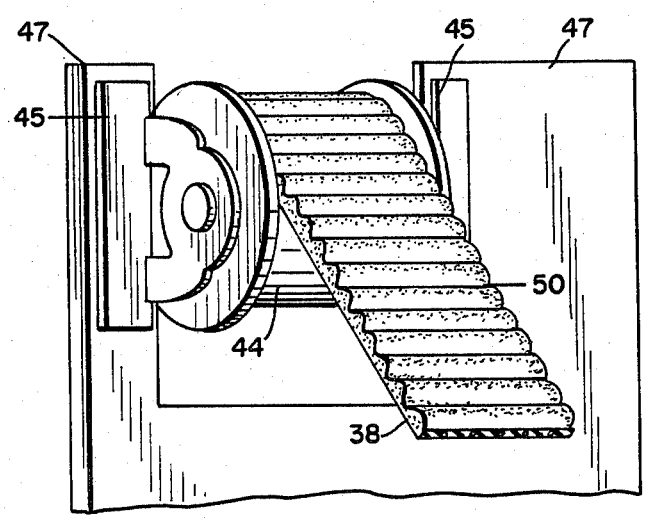
FIG. 4 is a fragmentary perspective view of the idler wheel and its adjustable mounting.

Any slack in the belt 38 is taken up by a smoothsurfaced idler wheel 44 which is arranged for rotation in the path of the belt on a take-up frame 45 adjustably fastened to a heavy gauge steel stanchion 47 securely mounted on platform 20. Details of this arrangement are shown more clearly in FIG. 4. For additional support, a diagonal steel bar strut (not shown) may be fastened at one end to the stanchion and at the other end to the platform. Stanchion 47 has a slot of suitable length to allow it to be traversed by the belt within the length of the vertical adjustment of the idler wheel. Vertical adjustment of the take-up frame 45, and thus of idler wheel 44 mounted thereon, urges the lower portion of the belt upwardly relative to the platform. The belt is in tension, with its outer surface riding on the rotating idler wheel and its toothed inner surface engaging the mating teeth of the two sprocket wheels, as described below in conjunction with FIG. 2.

The position of the wheel 44 relative to the shaft of the reduction sprocket wheel 35, and the respective dimensions of the two wheels, are such that the belt has positive engagement with from 72% to 78% of the circumference of the reduction wheel as the belt undergoes translational movement through its path with rotation of the engine pinion 23. In the preferred embodiment, the idler wheel had a diameter of seven inches, its center was 34 inches above the platform 20 and displaced approximately 33 inches horizontally from the center of reduction wheel 35, and the belt had an optimum wrap of 75% about the reduction wheel. The belt had a length of about 209 inches. Either or both of the idler wheel and the engine pinion should be flanged at the edges (e.g., see FIG. 4) to prevent the belt from riding off the wheels. Preferably, the engion pinion is flanged. In either case, the reduction wheel requires no flange.

Figure 2:
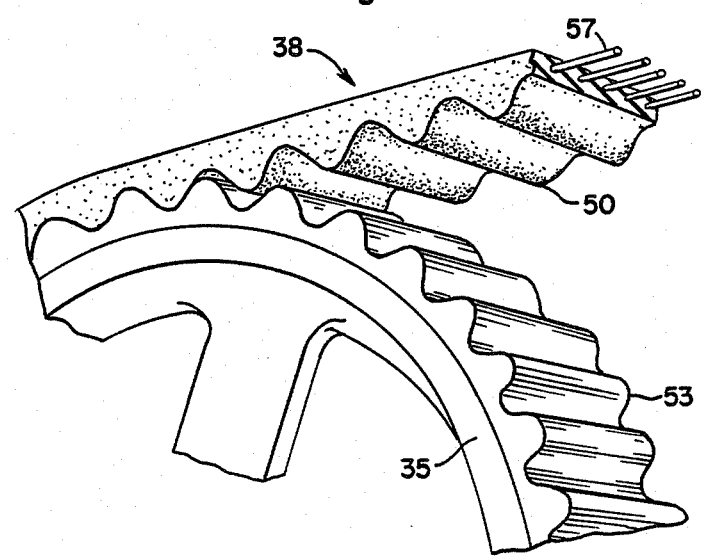
FIG. 2 is a fragmentary perspective view of a portion of the belt engaging a mating sprocket wheel.

As shown more clearly in FIG. 2, according to an important aspect of the invention the inner surface of the endless belt 38 is provided with curvilinear teeth 50 transverse to the length of the belt. The belt teeth may be fully rounded as shown, or may be beveled, to match the teeth 52, 53 on the two sprocket wheels 23 and 35, respectively, for precisely meshing therewith. Preferably, the belt is composed of neoprene to provide durability and flexibility. The backing of the belt is molded about a plurality of helically wound cables 57 extending longitudinally to provide the belt with high tensile strength. The neoprene teeth 50 are preferably covered with nylon facing to improve their wear resistance.

In operation, as the engine pinion 23 rotates, the endless belt 38 moves through its path, its teeth precisely meshing with the mating teeth of the pinion and the reduction wheel 35, thereby rotating the latter wheel and the associated gears which are selectively set in forward or reverse drive to engage the cable pulley. Thus, the cable is reeled out or reeled in, as desired, in conventional manner. However, the precise meshing of the teeth and the positive engagement of the belt with the two sprocket wheels, together with the optimum wrap of the belt about the reduction wheel and the relatively vibration-free movement of the belt over the idler wheel and throughout its path, combine to eliminate belt slippage and creepage. Moreover, the materials require no lubrication of the belt or the wheels to maintain smooth, fully synchronized, trouble-free operation.

The belt and sprocket wheels are available as Series HTD components from the R. B. Wood's Sons Co. of Chambersburg, Pa. The idler wheel may be obtained from the Brewer Machine and Gear Co. of St. Louis, Mo., and utilizes SKF bearings.

While a preferred embodiment of the invention has been described, it will be apparent to those skilled in the field from the foregoing disclosure that variations and modifications may be implemented without departing from the spirit and scope of the invention. Accordingly, it is intended that the invention be limited only by the appended claims.

What is claimed is:

1. A draw works for selectively reeling out and reeling in the cable of a power crane, comprising
   a stable platform,
   a power source mounted in fixed relationship to the platform, the power source having a rotatable output shaft,
   a pinion mounted on the shaft for rotation therewith,
   a rotatable speed reductions wheel mounted in fixed relationship to the platform, spaced from and aligned with the pinion in a common plane,
   a flexible endless belt wrapped on the pinion and the reduction wheel to engage a portion of the circumference of each for rotation with the pinion and transfer of the rotational power to the reduction wheel, the belt being wrapped about the reduction wheel with engagement of a portion in the range from 72 percent to 78 percent of the circumference of the reduction wheel, said belt at all times being free of external lubricant,
   the belt, the pinion, and the reduction wheel having curved mating teeth on the respective engaging surfaces thereof and transverse to the axes thereof for precise meshing of the belt teeth with the teeth on each of the pinion and the reduction wheel, said belt having a smooth outer surface opposite the surface of the belt having the curved teeth, said belt being composed of neoprene and further having a plurality of spaced high tensile strength cables molded longitudinally therein,
   a smooth rotatable idler wheel mounted in selectively adjustable relationship to the platform, between the pinion and the reduction wheel and aligned in the plane therewith, the idler wheel being positioned against the smooth outer surface of the belt for rotation with the movement of the belt while removing the slack in the belt to increase the percentage of wrap of the belt on the reduction wheel, and the selective adjustment of the idler wheel relative to the platform allowing the tension on the belt to be selectively increased or decreased,
   at least one of the pinion and the idler wheel having flanged edges to maintain the belt in place thereon, and a gear train coupled to the reduction wheel for rotation therewith, and coupled to the cable for selectively driving the cable in forward and reverse gears when the power output shaft, the pinion, the belt, and the reduction wheel are undergoing rotation.

2. The draw works according to claim 1, wherein the belt is wrapped about the reduction wheel with engagement of 75 percent of the circumference of the reduction wheel.

3. A mobile crane for raising and lowering materials at a job site by means of a cable coupled via a cable pulley to the draw works of the crane, comprising a power source with a rotatable output shaft mounted on the crane, first sprocket wheel means coupled to the power output shaft for rotation therewith, gear means for selectively driving the cable pulley in the forward and reverse directions to lower and raise the cable, respectively, second sprocket wheel means mounted on the crane at a position displaced from and aligned in the same plane with the first sprocket wheel means, and coupled to the gear means for rotation thereof in the selected forward and reverse directions, belt means in the form of an endless loop composed of a continuous unbroken web of flexible neoprene for wrapped engagement with the first and second sprocket wheel means to transfer rotational power from the engine to the cable pulley via the first and second sprocket wheel means and the gear means, the neoprene web having means encapsulated therein for providing longitudinal tensile strength to the belt means, the first sprocket wheel means having flanges to retain the belt means in the plane of the first and second sprocket wheel means during high speed movement of the belt means, each of the first and second sprocket wheel means having transverse curvilinear teeth on its respective circumference, and the belt means having matching transverse curvilinear teeth on the inner surface of the loop, for precisely meshing with the teeth on each of the first and second sprocket wheel means when the belt means is undergoing translational movement about the respective sprocket wheel means to transfer power from the first sprocket wheel means to the second sprocket wheel means without slippage of the belt means, the second sprocket wheel means having a considerably greater diameter than the diameter of the first sprocket wheel means, for speed reduction, and idler wheel means adjustably mounted on the crane for rotatable contact with the outer surface of said belt means, with selective tension thereon, between and in fixed relationship to the first and second sprocket wheel means and aligned in the same plane therewith, for maintaining the extent of wrap of the belt means engaging teeth on the second sprocket wheel means in the range from 72% to 78% of the circumference of the second sprocket wheel means.

* * * * *